US006745057B1

(12) United States Patent
Hankui

(10) Patent No.: US 6,745,057 B1
(45) Date of Patent: Jun. 1, 2004

(54) PORTABLE TELEPHONE

(75) Inventor: Eiji Hankui, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/552,561

(22) Filed: Apr. 19, 2000

(30) Foreign Application Priority Data

May 10, 1999 (JP) .......................................... 11-129266

(51) Int. Cl.[7] ................................................ H04M 1/00

(52) U.S. Cl. ............................... 455/575.5; 455/550.1; 455/344; 455/575.1; 455/90.3; 343/702; 343/836; 343/837; 343/841; 343/912; 379/440; 379/451; 361/816

(58) Field of Search ......................... 455/90, 550, 575, 455/344; 343/841, 702, 836, 837, 912; 379/440, 451; 361/816

(56) References Cited

U.S. PATENT DOCUMENTS 4,491,843 A * 1/1985 Boubouleix ................. 343/702
4,723,305 A * 2/1988 Phillips et al. ........... 455/575.7
5,394,149 A * 2/1995 Fujita et al. ................... 342/1
5,394,150 A * 2/1995 Naito et al. .................... 342/4
5,826,201 A * 10/1998 Gratias ....................... 455/575
5,940,039 A * 8/1999 Wang et al. ................ 343/702
5,977,917 A * 11/1999 Hirose ........................ 343/702
6,037,046 A * 3/2000 Joshi et al. ................. 428/212
6,075,977 A * 6/2000 Bayrami ...................... 455/90
6,220,955 B1 * 4/2001 Posa .......................... 454/184
6,341,217 B1 * 1/2002 Wong .......................... 455/90
6,404,403 B1 * 6/2002 Kunz et al. ................. 343/841
6,469,670 B2 * 10/2002 Ito ............................ 343/702
6,670,546 B2 * 12/2003 Okayama et al. ...... 174/35 MS

FOREIGN PATENT DOCUMENTS

| | | |
|---|---|---|
| EP | 0 878 863 | 11/1998 |
| GB | 2 301 228 | 11/1996 |
| JP | 62-183599 | 8/1987 |
| JP | 6-224583 | 8/1994 |
| JP | 6-232583 | 8/1994 |
| WO | WO 94/28595 | 12/1994 |
| WO | WO 95/31048 | 11/1995 |

OTHER PUBLICATIONS

Japanese Office Action dated Apr. 1, 2003 with English translation of pertinent portions.

* cited by examiner

*Primary Examiner*—William Trost
*Assistant Examiner*—Marcos Torres
(74) *Attorney, Agent, or Firm*—Whitham, Curtis & Christofferson P.C.

(57) ABSTRACT

The portable telephone includes an antenna and a metallic cabinet operating as main radiation sources of electromagnetic waves, a feeding point for supplying said antenna and said metallic cabinet with electric power, an outer packaging formed of such a material as plastics or resin, and a reflecting plate for reflecting the electromagnetic waves radiated from said radiation sources, the reflecting plate being provided for increasing the amount of the electromagnetic waves radiated into a free space when the portable telephone is in use, being selectively arranged at a position where an electric field component or a magnetic field component of the electromagnetic waves radiated from said radiation sources is dominant, and having an electric constant which enables effective reflection of said magnetic field component or said electric field component and causes little electric power absorption.

25 Claims, 15 Drawing Sheets

PORTABLE TELEPHONE

BACKGROUND OF THE INVENTION

1. Field of the Invention

The present invention relates to a portable telephone and, more particularly, to a portable telephone with high radiation efficiency and high communication performance.

2. Description of the Related Art

In recent years, portable radio communication equipment typified by a portable telephone has rapidly come into wide use among people.

FIG. 15A is a perspective view showing the whole of a basic structure of a conventional and typical portable telephone, and FIG. 15B shows a structure of the portable telephone with an outer packaging removed and FIG. 15C shows a structure only of the outer packaging.

The conventional portable telephone at least includes an antenna 2, a metallic cabinet 3, a feeding point 4 and an outer packaging 5, and the antenna 2 is electrically connected to the upper end portion of the metallic cabinet 3 through the feeding point 4 connected to the lower end portion of the antenna. The outer packaging 5 is made of a material such as plastic or resin and constituted by a hollow cubic portion 5*a* and a cylindrical portion 5*b* disposed on the upper surface of the portion 5*a*, in which a round hole 5*c* whose size is equivalent to the diameter of the cylindrical portion 5b is provided on the surface of the cubic portion 5*a* in contact with the cylindrical portion, and a speech transmission unit and a speech reception unit are arranged on one of surfaces of the outer packaging 5. Within the outer packaging 5, the metallic cabinet 3, the feeding point 4 and the vicinity of the lower end portion of the antenna 2 are disposed and the antenna 2 is structured to project from the cylindrical portion 5*b* through the round hole 5*c*. Here, the axis of the antenna is made coincide with the z-axis and a width direction and a thickness direction of the metallic cabinet are made coincide with the x-axis and the y-axis, respectively. In addition, the surface of the metallic cabinet and the surface of the outer packaging are in parallel to each other and positioned on the plane xz.

For radiating an electromagnetic wave from the portable telephone, power is supplied to the antenna 2 and the metallic cabinet 3 by the application of power to the feeding point 4 to operate them as main radiation sources. Although a portable telephone in general has a mechanism for transmission and reception, a matching circuit for efficiently supplying power to the feeding point and the like which are mounted on the metallic cabinet, detailed view thereof is omitted from the illustration.

With the conventional portable telephone, a user makes a call through the speech transmission unit and the speech reception unit provided on the surface of the outer packaging 5 while holding the outer packaging by his or her hand. At this state, an electromagnetic wave radiated from the portable telephone is emitted into a space, propagated and received at a base station to enable communication. However, since of the electromagnetic waves radiated from the portable telephone, electromagnetic waves radiated toward a human body are liable to attenuate, the electromagnetic waves to this direction contribute less to communication to cause a reduction of radiation efficiency as a result. As described in the foregoing, conventional portable telephones have shortcomings that a reduction in the amount of electromagnetic waves contributing to communication degrades radiation efficiency of the portable telephones to degrade communication performance accordingly.

SUMMARY OF THE INVENTION

An object of the present invention is to provide a portable telephone with improved communication performance which is attained by increasing radiation efficiency of electromagnetic waves contributing to communication while a call is being made.

Another object of the present invention is to enable even a portable telephone required to be smaller in size and thinner to realize an increase in the amount of electromagnetic waves contributing to communication, thereby improving radiation efficiency during a call to achieve improvement in communication performance by using a reflecting plate also as an outer packaging of the portable telephone.

According to one aspect of the invention, a portable telephone including an antenna and a metallic cabinet operating as main radiation sources of electromagnetic waves, a feeding point for supplying the antenna and the metallic cabinet with electric power, an outer packaging formed of a material such as plastics or resin, and a reflecting plate for reflecting the electromagnetic waves radiated from the radiation sources, wherein the reflecting plate is provided for increasing the amount of electromagnetic waves radiated into a free space when the portable telephone is in use, selectively arranged at a position where an electric field component or a magnetic field component of the electromagnetic waves radiated from the radiation sources is dominant, and has an electric constant which enables effective reflection of the magnetic field component or the electric field component and causes little electric power absorption.

In the preferred construction, the reflecting plate is contained in the outer packaging and provided in the vicinity of the radiation sources and on the side where a speech transmission unit and a speech reception unit are disposed.

In another preferred construction, the reflecting plate is a flat plate of a predetermined size and arranged in parallel to the metallic cabinet surface.

In another preferred construction, the reflecting plate is contained in the outer packaging and provided in the vicinity of the radiation sources and on the side where a speech transmission unit and a speech reception unit are disposed, and a flat plate of a predetermined size and arranged in parallel to the metallic cabinet surface.

In another preferred construction, the reflecting plate is a flat plate of a predetermined size and arranged aslant with respect to the metallic cabinet surface.

In another preferred construction, the reflecting plate is contained in the outer packaging and provided in the vicinity of the radiation sources and on the side where a speech transmission unit and a speech reception unit are disposed, and the reflecting plate is a flat plate of a predetermined size and arranged aslant with respect to the metallic cabinet surface.

In another preferred construction, the reflecting plate is formed to be convex having a curvature at the side opposite to a direction in which the electromagnetic waves are incident and arranged to have a substantial vertex of the convexity face to the side of the radiation sources.

In another preferred construction, the reflecting plate is contained in the outer packaging and provided in the vicinity of the radiation sources and on the side where a speech transmission unit and a speech reception unit are disposed, and the reflecting plate is formed to be convex having a curvature at the side opposite to a direction in which the electromagnetic waves are incident and arranged to have a substantial vertex of the convexity face to the side of the radiation sources.

In another preferred construction, the reflecting plate is bent to be V-shaped toward the side opposite to a direction in which the electromagnetic waves are incident.

In another preferred construction, the reflecting plate is contained in the outer packaging and provided in the vicinity of the radiation sources and on the side where a speech transmission unit and a speech reception unit are disposed, and the reflecting plate is bent to be V-shaped toward the side opposite to a direction in which the electromagnetic waves are incident.

In another preferred construction, the reflecting plate is formed of a magnetic material having such a complex relative permeability as causes little power absorption of the electromagnetic waves radiated from the radiation sources.

In another preferred construction, the reflecting plate is formed of a dielectric material having such a complex relative dielectric constant as causes little power absorption of the electromagnetic waves radiated from the radiation sources.

In another preferred construction, the reflecting plate is provided in the plural including:

a reflecting plate formed of a magnetic material having such a complex relative permeability as causes little power absorption of the electromagnetic waves radiated from the radiation sources, and a reflecting plate formed of a dielectric material having such a complex relative dielectric constant as causes little power absorption of the electromagnetic waves radiated from the radiation sources.

In another preferred construction, a reflecting plate formed of a magnetic material is disposed at a region where a magnetic field component of the electromagnetic waves generated from the radiation sources is dominant and a reflecting plate formed of a dielectric material is disposed at a region where an electric field component of the electromagnetic waves generated from the radiation sources is dominant.

In another preferred construction, a reflecting plate formed of a magnetic material is disposed to cover the vicinity of the feeding point and a reflecting plate formed of a dielectric material is disposed to cover the vicinity of a lower end portion of the metallic cabinet.

In another preferred construction, the reflecting plate is a reflecting plate formed of a magnetic material whose complex relative permeability at a frequency used in the portable telephone has a real part value larger than 1 and has an imaginary part value approximate to 0.

In another preferred construction, the reflecting plate is a reflecting plate formed of a magnetic material whose complex relative permeability at a frequency used in the portable telephone has a real part value larger than 1 and has an imaginary part value approximate to 0 and which has no conductivity.

In another preferred construction, the reflecting plate is a reflecting plate formed of a dielectric material whose complex relative dielectric constant at a frequency used in the portable telephone has a real part value larger than a value of a real part of a complex relative dielectric constant of the outer packaging and has an imaginary part value approximate to 0.

According to another aspect of the invention, a portable telephone including an antenna and a metallic cabinet operating as main radiation sources of electromagnetic waves, a feeding point for supplying the antenna and the metallic cabinet with electric power, and an outer packaging, wherein the outer packaging is for increasing the amount of electromagnetic waves radiated into a free space when the portable telephone is in use and has a region where an electric field component or a magnetic field component of the electromagnetic waves radiated from the radiation sources is dominant partially provided with a material having an electric constant which enables effective reflection of the magnetic field component or the electric field component.

In the preferred construction, in the outer packaging, a part of the surface of the outer packaging which is in the vicinity of the radiation sources and at the side where a speech transmission unit and a speech reception unit are disposed is provided with a region of a magnetic material whose complex relative permeability at a frequency used in the portable telephone has a real part value larger than 1 and has an imaginary part value approximate to 0 and the remaining part is formed of a material such as plastics or region.

In another preferred construction, in the outer packaging, a part of the surface of the outer packaging which is in the vicinity of the radiation sources and at the side where a speech transmission unit and a speech reception unit are disposed is provided with a region of a dielectric material whose complex relative dielectric constant at a frequency used in the portable telephone has a real part value larger than a value of a real part of a complex relative dielectric constant of the material such as plastics or resin and has an imaginary part value approximate to 0 and the remaining part is formed of a material such as plastics or resin.

In another preferred construction, a magnetic field distribution and an electric field distribution in the vicinity of the radiation sources are evaluated in advance to form a part of the outer packaging at a region where a magnetic field component is dominant by using a magnetic material and a part of the outer packaging at a region where an electric field component is dominant by using a dielectric material, form the outer packaging by using the magnetic material and the dielectric material and form the remaining part by using such a material as plastics or resin.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

Figure 1:
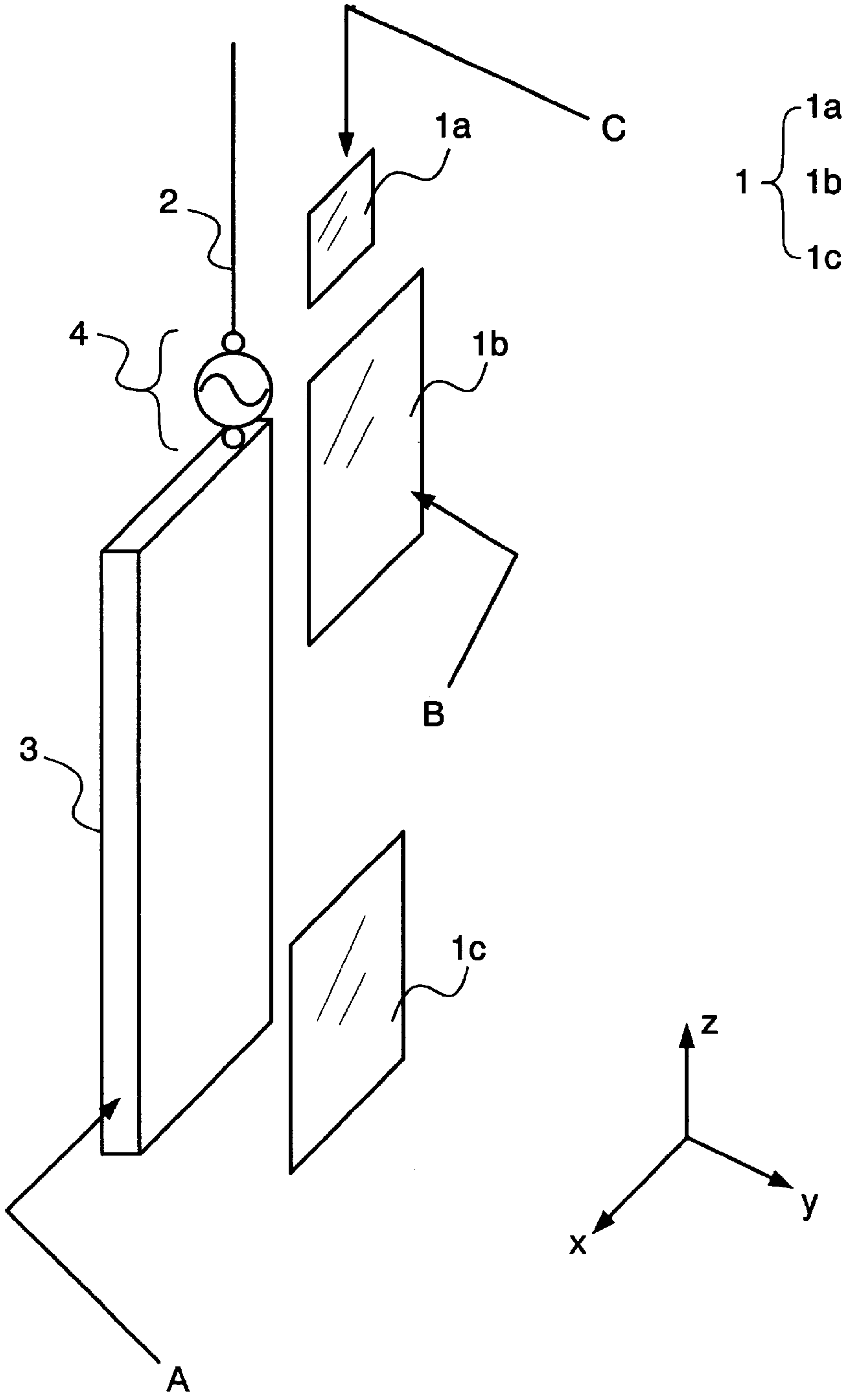
FIG. 1 is a perspective view showing a portable telephone according to a first embodiment of the present invention with an outer packaging removed.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, the present invention will be outlined.

In order to reduce electromagnetic waves in such a direction that lessens a contribution to communication, a reflecting plate is arranged in the vicinity of a radiation source to increase the amount of electromagnetic waves radiated toward a space in a direction where no human body is located (also referred to as "free space" hereinafter), thereby increasing the amount of electromagnetic waves contributing to communication and improving radiation efficiency during a call to improve communication performance. More specifically, dispose a single or a plurality of reflecting plates at a side on which a speech transmission unit and a speech reception unit are located in an outer packaging of a portable telephone and at a position where an electric field component and/or a magnetic field component is dominant to intend to increase the amount of electromagnetic waves radiated into a free space when the portable telephone is being used.

When used as a reflecting plate is, for example, a material having a loss, that is, a magnetic material having a value in an imaginary part $\mu r''$ of a complex relative permeability $\mu r = \mu r' - j\mu r''$ ($\mu r'$: real part, $\mu r''$: imaginary part, j: imaginary number unit) at a frequency used in a portable telephone or a dielectric material having a value in an imaginary part $\epsilon r''$ of a complex relative dielectric constant $\epsilon r = \epsilon r' - j\epsilon r''$ ($\epsilon r'$: real part, $\epsilon r''$: imaginary part), electric power absorption of electromagnetic waves proportional to the imaginary part $\mu r''$ or the imaginary part $\epsilon r''$, is involved, whereby a part of the electromagnetic waves radiated from a radiation source is absorbed by the reflecting plate to reduce the amount of the electromagnetic waves contributing to communication, which prevents sufficient improvement of radiation efficiency. In the present embodiment, since decreasing the values of the imaginary parts $\mu r''$ and $\epsilon r''$ makes a reflecting plate effective, a reflecting plate formed of a lossless magnetic material or dielectric material having a value of an imaginary part approximate to 0 is used.

As conditions of a reflecting plate formed of a magnetic material, the material should have a real part $\mu r'$ of a complex relative permeability whose value is larger than 1 and an imaginary part $\mu r''$ whose value is approximate to 0 and as conditions of a reflecting plate formed of a dielectric material, when an outer packaging exists, the material should have a real part $\epsilon r'$ of a complex relative dielectric constant of the reflecting plate whose value is larger than a value of a real part of a complex relative dielectric constant of the outer packaging and an imaginary part $\epsilon r''$ approximate to 0 in consideration of the complex relative dielectric constant of the outer packaging in order not to cause effects of electric power absorbed at the reflecting plate.

Since a conductivity a is in proportional to an imaginary part of a complex relative dielectric constant($=\sigma/(\omega \cdot \epsilon 0)$, $\epsilon 0$: dielectric constant in air, $\omega$: each frequency), the conductivity can be equivalently handled as the imaginary part of the complex relative dielectric constant. Thus, in terms of a conductivity, the above-described material having $\epsilon r''$ approximate to 0 is equivalent to that having a conductivity approximate to 0 and therefore a reflecting plate formed of a dielectric material should be free of conductivity.

Figure 15A:
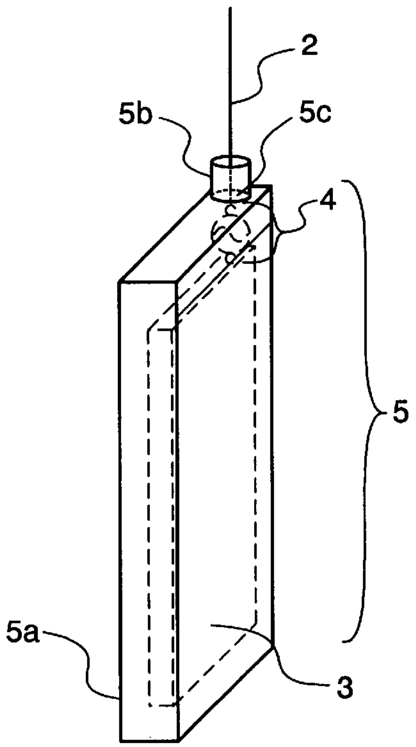
FIG. 15A (PRIOR ART)
FIG. 15A is a perspective view showing the whole of a basic structure of a conventional portable telephone.
Figure 15B:
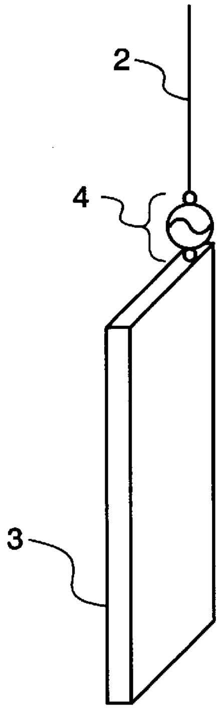
FIG. 15B (PRIOR ART)
FIG. 15B is a perspective view showing a state of the conventional portable telephone in which its outer packaging is removed.
Figure 15C:
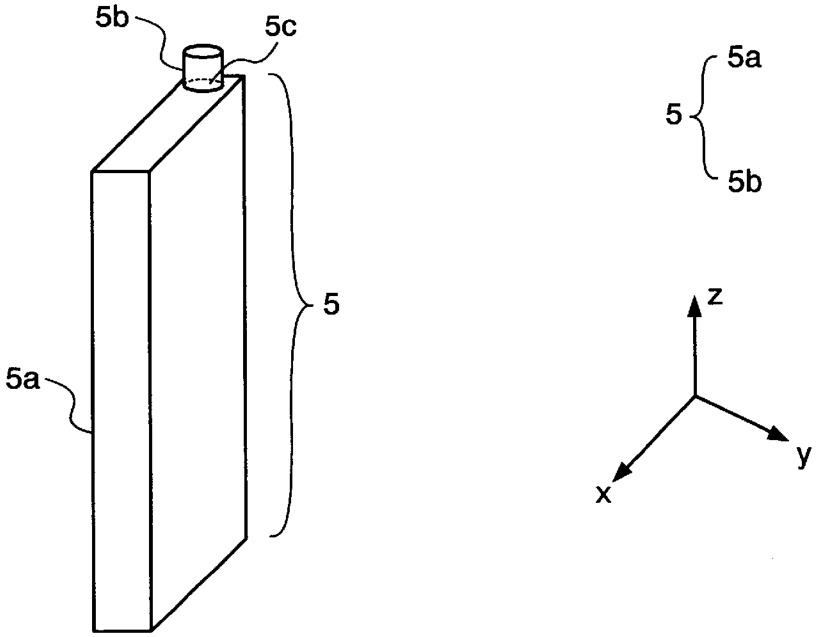
FIG. 15C (PRIOR ART)
FIG. 15C is a perspective view of the outer packaging of the conventional portable telephone.

For improving radiation efficiency, a reflecting plate formed of a magnetic material is arranged at a place where a magnetic field is dominant and that formed of a dielectric material is arranged at a place where an electric field is dominant. In, for example, a portable telephone having a λ/4-type antenna structure in which an antenna 2 is approximately λ/4 long (λ: wavelength) and a metallic cabinet 3 is also approximately λ/4 long (FIGS. 15A to 15C), the antenna and the metallic cabinet equivalently operate as a half-wave length dipole antenna, and a current distribution over a radiation source is liable to show a sine-wave distribution in which the current shows a peak value in the vicinity of a feeding point 4 and the same shows a small value at the top of the antenna 2 and at a lower end portion of the metallic cabinet 3.

Therefore, in the vicinity of the feeding point 4, the magnetic field strength is great, and in the vicinity of the lower end portion of the metallic cabinet 3, the electric field strength is great. In other words, in the electromagnetic waves radiated from the vicinity of the feeding point 4, a magnetic field component is dominant and in the electromagnetic waves radiated from the vicinity of the lower end portion of the metallic cabinet 3, an electric field component is dominant. Since in general, a magnetic material acts effectively on magnetic field reflection and a dielectric material acts effectively on electric field reflection, in a portable telephone having such an antenna structure, a reflecting plate formed of a magnetic material is arranged in the vicinity of the feeding point 4 where a magnetic field is dominant and a reflecting plate formed of a dielectric material is arranged in the vicinity of the lower end portion of the metallic cabinet 3 where an electric field is dominant.

Embodiment 1

FIG. 1 is a perspective view showing a portable telephone according to a first embodiment of the present invention with an outer packaging removed.

Figure 2A:
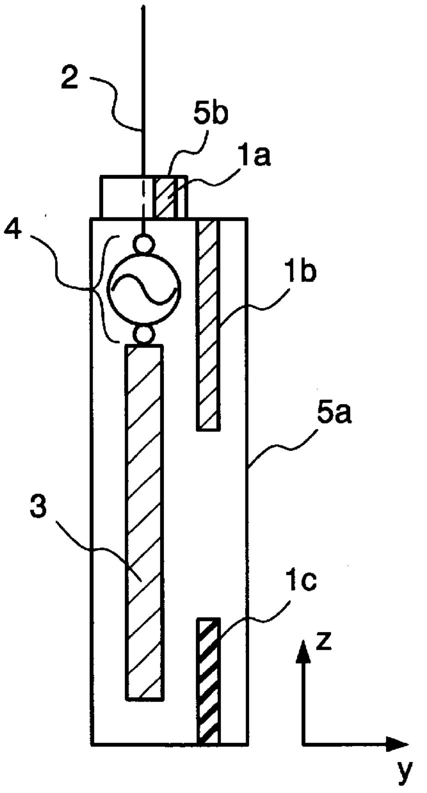
FIG. 2A is a cross-sectional view of the first embodiment with the outer packaging attached.
Figure 2B:
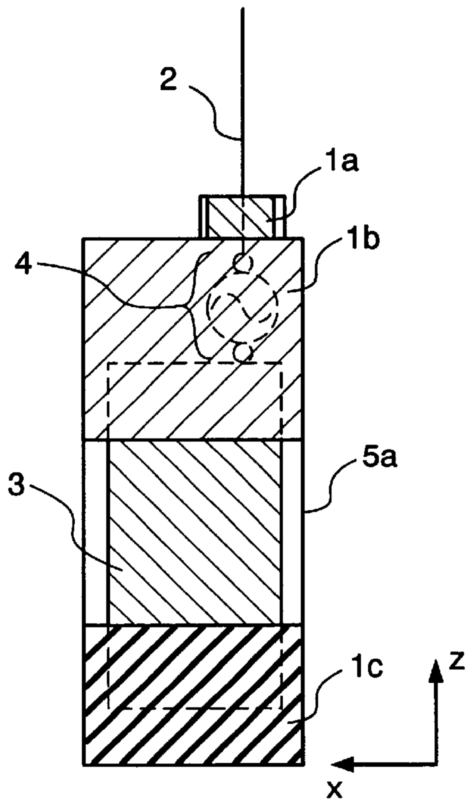
FIG. 2B is a front sectional view of the first embodiment with the outer packaging attached.
Figure 2C:
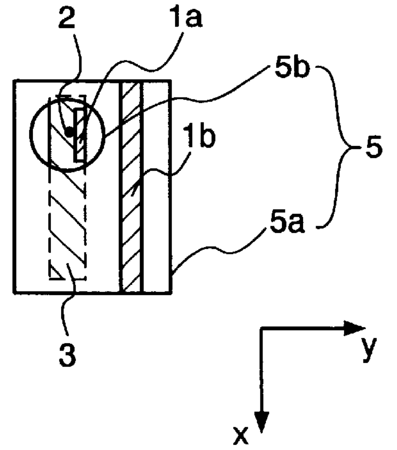
FIG. 2C is a top sectional view of the first embodiment with the outer packaging attached.

FIGS. 2A to 2C are views showing the portable telephone at a state where the outer packaging is attached. FIG. 2A is a cross-sectional view of the telephone taken along the section of a metallic cabinet 3 on a plane yz in FIG. 1 and seen from the direction A, FIG. 2B is a front sectional view of the same seen from above the surface of a reflecting plate 1*b* on a plane xz in FIG. 1 and from the direction B and FIG. 2C is a top sectional view of the same seen from the top surface of a reflecting plate 1*a* on a plane xy in FIG. 1 and from the direction C.

As can be seen from FIG. 1 and FIGS. 2A to 2C, the portable telephone of the present embodiment at least includes the reflecting plate 1, an antenna 2, the metallic cabinet 3, a feeding point 4 and the outer packaging 5. The antenna 2, the metallic cabinet 3, the feeding point 4 and the outer packaging 5 of the present embodiment may be the same as conventional ones and for generating electromagnetic waves from the portable telephone, power is supplied to the feeding point to make the antenna and the metallic cabinet operate as main radiation sources. In other words, the present embodiment is characterized in that a reflecting plate is newly attached in a basic structure of a conventional and typical portable telephone to improve radiation efficiency.

In the portable telephone illustrated in FIG. 1 and FIGS. 2A to 2C, the antenna and the metallic cabinet are set to have a length of approximately λ/4 and three reflecting plates 1*a*, 1*b* and 1*c* are arranged near the radiation sources and on the side where a speech transmission unit and a speech reception unit are placed. The reflecting plates 1*a* and 1*b* are formed of a magnetic material whose complex relative permeability has, at a frequency used in the portable telephone, a desired value of a real part larger than 1 and has a value of an imaginary part approximate to 0. The reflecting plate 1*c* is formed of a dielectric material whose complex relative dielectric constant has, at a frequency band of the portable telephone, a desired value of a real part larger than that of a real part of a complex relative dielectric constant of the outer packaging and has a value of an imaginary part approximate to 0.

As can be seen from FIGS. 2A to 2C, the reflecting plates 1 are flat plates whose width (corresponding to the direction x), a thickness (corresponding to the direction y) and a length (corresponding to the direction z) are set to have desired values and which are all arranged to be in parallel to the surface of the metallic cabinet (corresponding to the plane xz). In addition, the reflecting plates are disposed near the radiation sources and at desired positions within the outer packaging.

The reflecting plate 1*a* is placed within a cylindrical portion 5*b* provided on the upper surface of the outer packaging 5, which is a plate having a length equal to that of the cylindrical portion 5*b* and arranged near the lower end portion of the antenna.

The reflecting plate 1*b* is disposed covering the vicinity of the feeding point 4 and the vicinity of the upper end portion of the metallic cabinet 3, which is here a reflecting plate approximately equal to the width of the outer packaging arranged so as to have its upper surface be in contact with the outer packaging.

The reflecting plate 1*c* is disposed covering the vicinity of the lower end portion of the metallic cabinet 3, which is here a reflecting plate whose thickness and width are equal to those of the reflecting plate 1*b* arranged to have its lower surface be in contact with the outer packaging. The reflecting plate 1*c* and the reflecting plate 1*b* are positioned on the same plane.

In the portable telephone having the antenna structure as illustrated in FIG. 1, a current distribution over a radiation source is liable to show a sine-wave distribution in which the magnetic field strength is great in the vicinity of the feeding point 4 and the electric field strength is great in the vicinity of the lower end portion of the metallic cabinet 3. In other words, in the electromagnetic waves radiated from the vicinity of the feeding point 4, a magnetic field component is dominant and in the electromagnetic waves radiated from the vicinity of the lower end portion of the metallic-cabinet 3, an electric field component is dominant. Therefore, with the above-described reflecting plates 1*a*, 1*b* and 1*c*, electromagnetic waves radiated from the radiation sources are here effectively reflected in a manner as described in the following.

More specifically, as can be seen from FIG. 1 and FIGS. 2A to 2C, since the reflecting plates 1*a* and l*b* formed of a magnetic material are placed in the vicinity of the feeding point 4 and have a desired value of a complex relative permeability, magnetic field reflecting efficiency is high. Therefore, the electromagnetic waves which are radiated from the vicinity of the feeding point 4 and whose dominant component is a magnetic field component will be reflected by these reflecting plates toward the direction opposite to that of a human body in which the electromagnetic waves are liable to attenuate. The reflecting plate 1*a* acts effectively mainly on electromagnetic waves which are radiated from the vicinity of the lower end portion of the antenna 2 and whose dominant component is a magnetic field component, while the reflecting plate 1*b* acts effectively mainly on electromagnetic waves which are radiated from the vicinity of the feeding point 4 and the vicinity of the upper end portion of the metallic cabinet 3 and whose dominant component is a magnetic field component.

For reflecting an electric field component, the reflecting plate 1*c* is used. More specifically, as can be seen from FIG. 1 and FIGS. 2A to 2C, since the reflecting plate 1*c* formed of a dielectric material is placed in the vicinity of the lower end portion of the metallic cabinet 3 and has a desired value of a complex relative dielectric constant, electric field reflecting effect is high. Therefore, the electromagnetic waves which are radiated from the vicinity of the lower end portion of the metallic cabinet 3 and whose dominant component is an electric field component will be reflected by the reflecting plate 1*c* toward the opposite direction.

Since the reflecting plates 1*a*, 1*b* and 1*c* barely have values in an imaginary part of a complex relative permeability and an imaginary part of a complex relative dielectric constant, they involve none of effects of power absorption by reflecting plates which are problems of a reflecting plate having a loss. Therefore, in the portable telephone of the present invention, the reflecting plates reflect electromagnetic waves with little power absorption.

As described in the foregoing, the present invention intends to make effective use of electromagnetic waves which have a small contribution to communication in conventional techniques by arranging a reflecting plate at an appropriate position within a portable telephone to reflect electromagnetic waves from an radiation source to an opposite direction. In addition, since the reflecting plate has a value of an imaginary part of a complex relative permeability and a value of an imaginary part of a complex relative dielectric constant both approximate to 0, it involves little power absorption at the time of irradiation of electric waves. As a result, the amount of electromagnetic waves contributing to communication is increased, which is followed by improvement of radiation efficiency during a call to improve communication performance.

Although the reflecting plates 1*a* and 1*b* formed of a magnetic material and the reflecting plate 1*c* formed of a dielectric material are arranged as an example here, the portable telephone may be structured to have only the reflecting plates formed of a magnetic material arranged, for example, or have either one of the reflecting plates formed of a magnetic material arranged. It is also possible to arrange only the reflecting plate formed of a dielectric material to structure the portable telephone.

Embodiment 2

Figure 3:
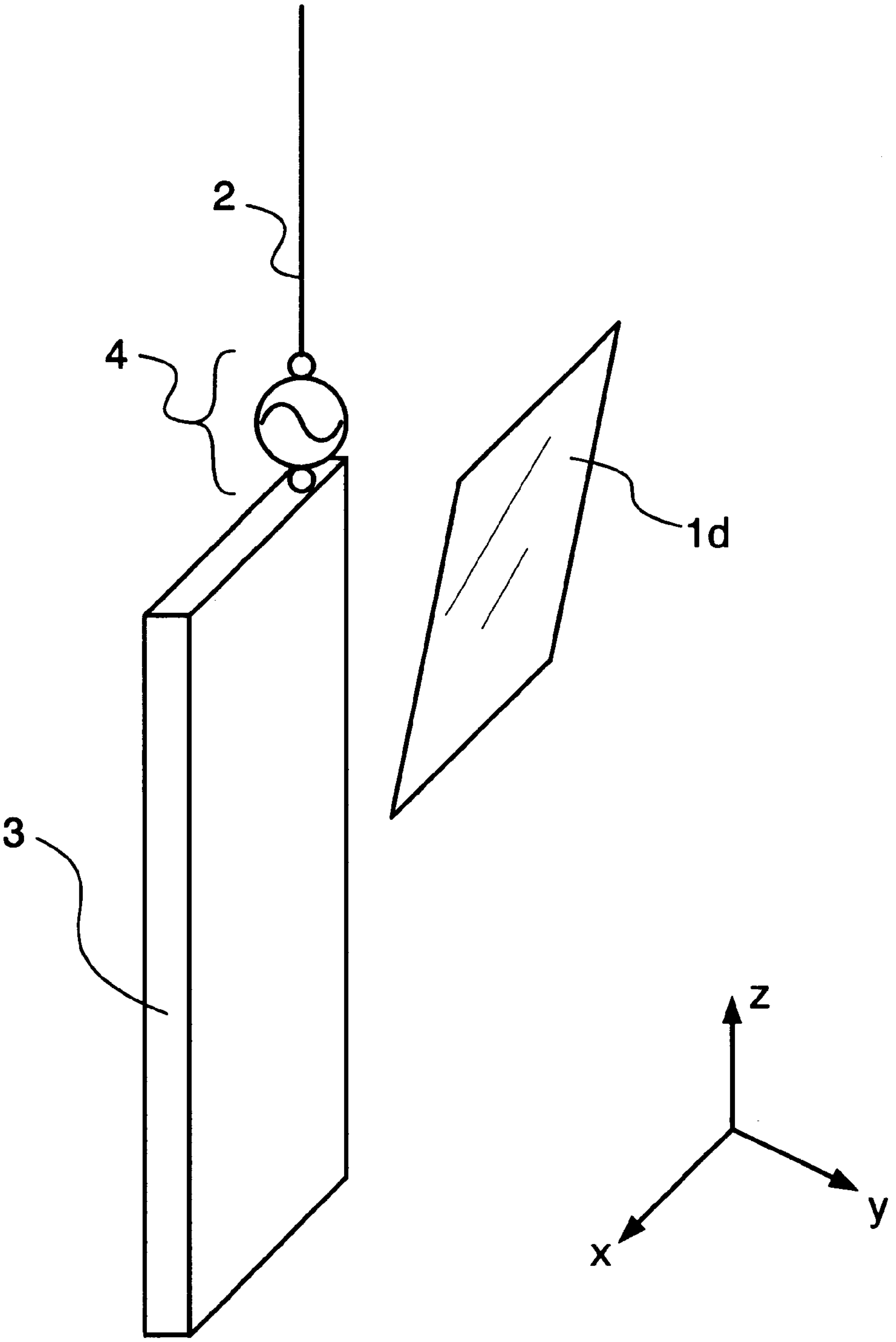
FIG. 3 is a perspective view showing a portable telephone according to a second embodiment of the present invention with an outer packaging removed.
Figure 4A:
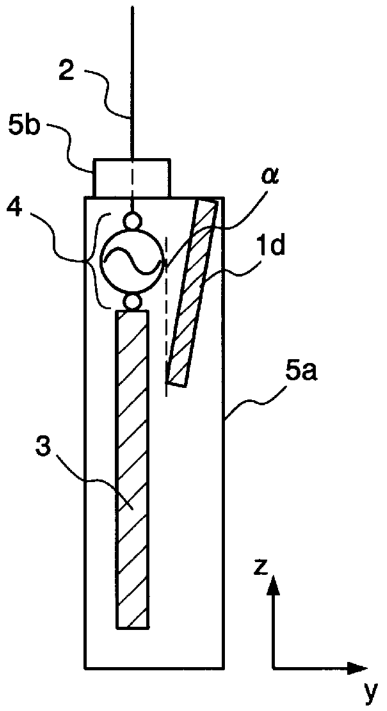
FIG. 4A is a cross-sectional view of the second embodiment with the outer packaging attached.
Figure 4B:
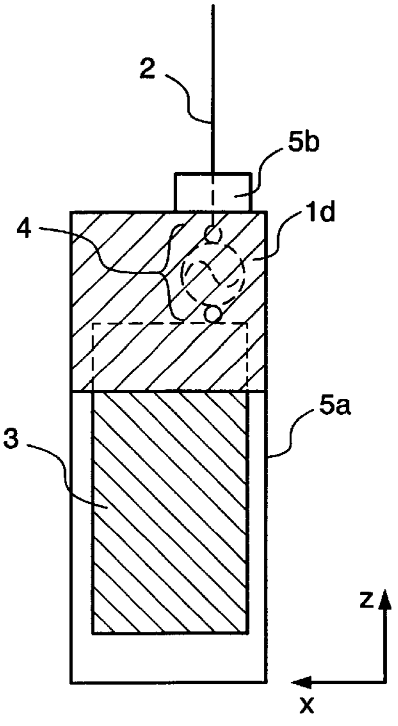
FIG. 4B is a front sectional view of the second embodiment with the outer packaging attached.
Figure 4C:
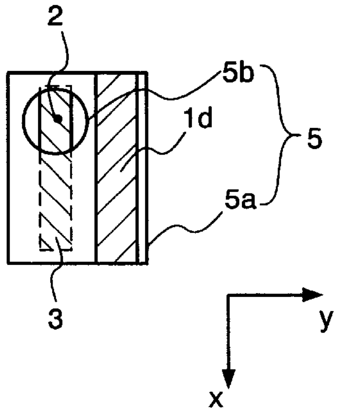
FIG. 4C is a top sectional view of the second embodiment with the outer packaging attached.

FIG. 3 is a perspective view of a portable telephone according to a second embodiment of the present invention, which shows a structure of the portable telephone with an outer packaging removed. State of the portable telephone with the outer packaging attached is shown in FIGS. 4A to 4C. The respective sectional views of FIGS. 4A, 4B and 4C show completely the same sections as those illustrated in FIGS. 2A to 2C, respectively, and FIG. 4A is a cross-sectional view, FIG. 4B is a front sectional view and FIG. 4C is a top sectional view.

As can be seen from FIG. 3 and FIGS. 4A to 4C, the portable telephone of the present embodiment is a modification of the first embodiment (Embodiment 1) with the only difference in the location of a reflecting plate, in which the same antenna 2, metallic cabinet 3 and outer packaging 5 as those of the first embodiment are used. Illustrated here as an example is a flat plate type reflecting plate 1*d* formed of a magnetic material arranged to cover the vicinity of the feeding point 4 and the vicinity of the upper end portion of the metallic cabinet 3, which arrangement substantially corresponds to that of the flat plate type reflecting plate 1*b* shown in the first embodiment (Embodiment 1). Used as the reflecting plate 1*d*is a plate having the same configuration, size and complex relative permeability as those of the reflecting plate 1*b*.

As can be seen from FIGS. 4A to 4C, the reflecting plate is disposed aslant with respect to the surface of the metallic cabinet 3 so as to have its upper side be in contact with the outer packaging and have an angle between the z-axis and the reflecting plate be $\alpha$.

While in the first embodiment, the reflecting plates are disposed to be in parallel to the surface of the metallic cabinet, in the present embodiment, the flat plate type reflecting plate 1*d* is disposed aslant with respect to the surface of the metallic cabinet to change the reflection direction of electromagnetic waves incident on the reflecting plate, thereby reducing the effects of a hand holding the portable telephone exercised upon communication performance as described in the following.

Figure 13A:
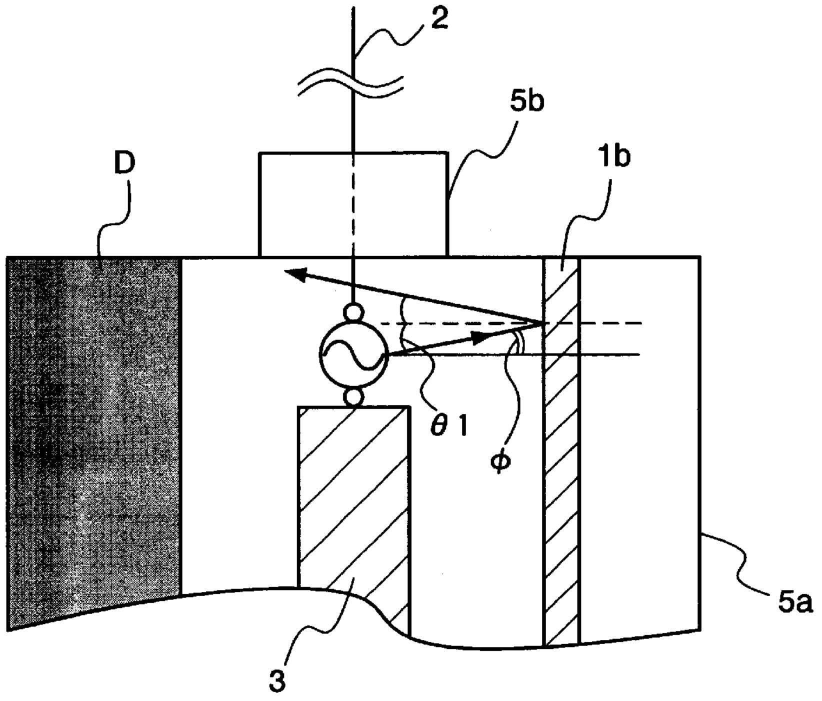
FIG. 13A is a view schematically showing a direction of reflection of an electromagnetic wave in a plane yz when a flat plate type reflecting plate is arranged.
Figure 13B:
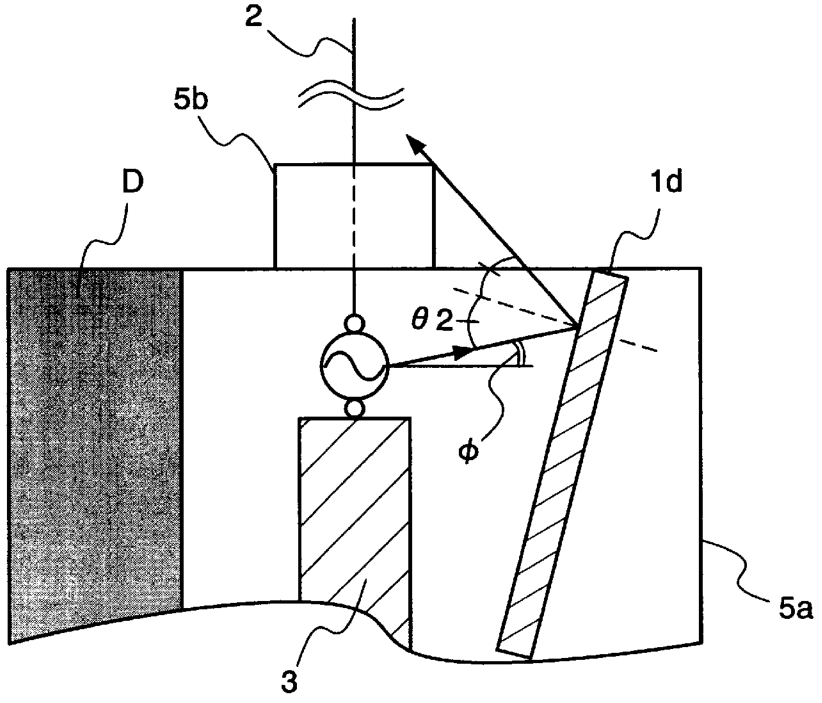
FIG. 13B is a view schematically showing a direction of reflection of an electromagnetic wave in the plane yz when a flat plate type reflecting plate is arranged.

FIGS. 13A and 13B are expansion, at the vicinity of the reflecting plate, of a cross-sectional view showing a state where the flat plate type reflecting plate is located near the radiation sources and schematically show electromagnetic wave reflection directions in the plane yz. FIG. 13A shows a case where the reflecting plate 1*b* is arranged in parallel to the surface of the metallic cabinet in the first embodiment shown in FIG. 1 and FIGS. 2A to 2C, which case corresponds to a figure obtained by removing the reflecting plates 1*a* and 1*c* from FIG. 2A. FIG. 13B shows a case where the reflecting plate 1*d* of the present embodiment is disposed aslant, which corresponds to FIG. 4A. Assuming here that a call is made by a user holding, for example, the vicinity of the uppermost part of the outer packaging by his or her hand, a region D at which the hand is positioned is illustrated in the figure.

When electromagnetic waves are incident on the surface of the reflecting plate at an angle of incidence of $\theta$, an angle of reflection of the reflected electromagnetic waves is equal to the angle of incidence. Here, an angle of incidence is an angle between the direction of incidence of electromagnetic waves and a perpendicular on the surface of the reflecting plate on which the electromagnetic waves are incident, while an angle of reflection is an angle between the perpendicular and the direction of reflection of the electromagnetic waves. In FIGS. 13A to 13B, consideration will be given to a case where an electromagnetic wave radiated from the radiation source in the angle $\phi$ direction is incident on the surface of the reflecting plate. In the case of FIG. 13B, since the reflecting plate is disposed aslant, an angle of incidence $\theta 2$ in this case is larger than an angle of incidence $\theta 1$ in the case of FIG. 13A and an angle of reflection is accordingly large. As a result, as can be seen from the figures, while the direction of reflection of the electromagnetic wave is a direction of a free space off to the above in the case of FIG. 13B, the direction approximates to a parallel direction to attain a direction of the region where the hand is located in the case of FIG. 13A.

Accordingly, when the reflecting plate 1*b* is arranged in parallel to the surface of the metallic cabinet, although attenuation of electromagnetic waves by a hand is relatively small, because of the effects there is a possibility that the amount of electromagnetic waves contributing to communication will be reduced. Under these circumstances, in a case where it is assumed that a user makes a call while holding the uppermost part of the outer packaging by his or her hand, it is preferable, in order to effectively improve radiation efficiency, to dispose the reflecting plate 1*d* aslant to the metallic cabinet as illustrated in FIG. 13B, thereby making the electromagnetic wave reflection direction face in the direction of a free space off to the above.

Because in the portable telephone according to the present embodiment, the reflecting plate 1*d* is disposed at a position approximately the same as that of the reflecting plate 1*b* of the first embodiment shown in FIG. 1 and FIGS. 2A to 2C, the electromagnetic waves which are radiated from the vicinity of the feeding point 4 and the vicinity of the upper end portion of the metallic cabinet 3 and whose dominant component is a magnetic field component will be effectively reflected by the reflecting plate 1*d* toward the opposite direction as has been described in Embodiment 1.

As described in the foregoing, with the portable telephone of the present embodiment in which a reflecting plate is disposed aslant with respect to the surface of a metallic cabinet, more electromagnetic waves are radiated toward a direction which is opposite to the direction in which a speech transmission unit and a speech reception unit are arranged and which is the direction of a free space, so that effects of a hand exercised on communication performance is reduced to further improve radiation efficiency during a call, thereby improving communication performance.

Embodiment 3

Figure 5:
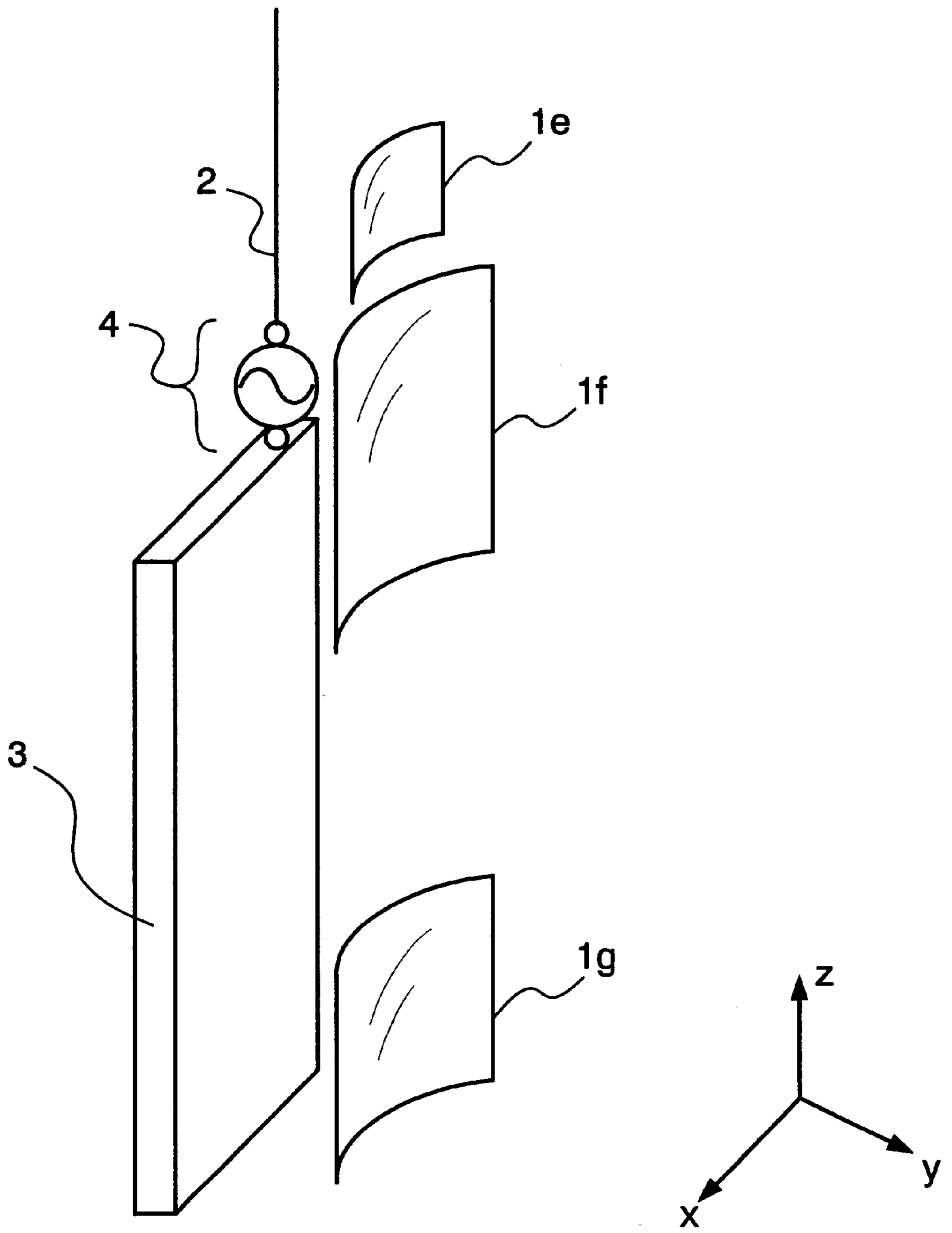
FIG. 5 is a perspective view showing a portable telephone according to a third embodiment of the present invention with an outer packaging removed.
Figure 6A:
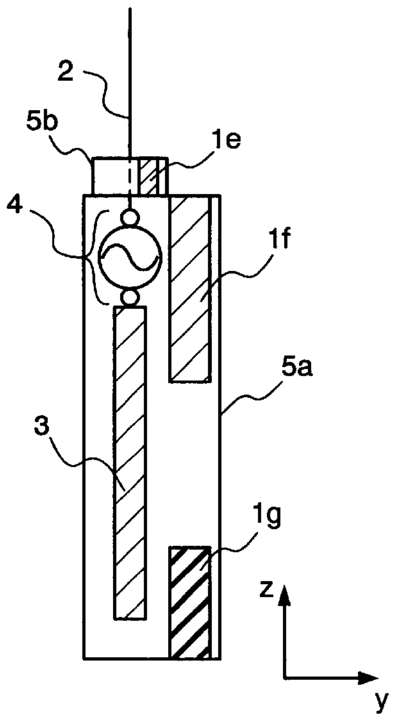
FIG. 6A is a cross-sectional view of the third embodiment with the outer packaging attached.
Figure 6B:
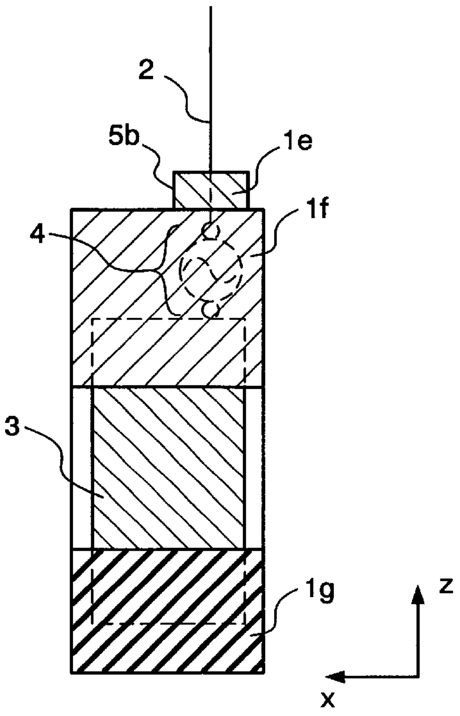
FIG. 6B is a front sectional view of the third embodiment with the outer packaging attached.
Figure 6C:
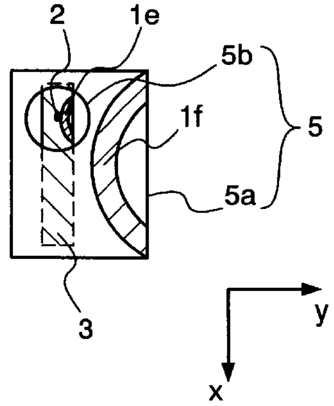
FIG. 6C is a top sectional view of the third embodiment with the outer packaging attached.

FIG. 5 is a perspective view of a portable telephone according to a third embodiment of the present invention, which shows a structure of the portable telephone with an outer packaging removed. State of the portable telephone with the outer packaging attached is shown in FIGS. 6A to 6C. The respective sectional views of FIGS. 6A, 6B and 6C show completely the same sections as those illustrated in FIGS. 2A to 2C, respectively, and FIG. 6A is a cross-sectional view, FIG. 6B is a front sectional view and FIG. 6C is a top sectional view.

The portable telephone of the present embodiment is a modification of the portable telephone shown in the first embodiment (Embodiment 1) with the only difference in configuration of the reflecting plates, in which the same antenna 2, metallic cabinet 3 and outer packaging 5 as those of the first embodiment are used. Illustrated here as an example are reflecting plates 1*e* and 1*f* formed of a magnetic material and arranged to cover the vicinity of the feeding point 4 and a reflecting plate 1*g* formed of a dielectric material and arranged to cover the vicinity of the lower end portion of the metallic cabinet 3.

In the portable telephone of the present embodiment, as can be seen from FIG. 5 and FIGS. 6A to 6C, used as a reflecting plate is a convex or curved reflecting plate having a curvature. The reflecting plates 1*e*, 1*f* and 1*g* are designed to have a desired curvature toward the side opposite to the incident side on which electromagnetic waves are incident and along a direction of the width of the metallic cabinet 3 (corresponding to the direction x).

The reflecting plates 1*e*, 1*f* and 1*g* are disposed to have their vertexes of convexities (curves) face to the radiation source side and have their back end surfaces be in parallel to the surface of the metallic cabinet as can be seen from FIG. 5 and FIG. 6C. The reflecting plates 1*e*, 1*f* and 1*g* correspond to 1*a*, 1*b* and 1*c* shown in the first embodiment (Embodiment 1), respectively, and the respective reflecting plates are equal in thickness, width and length, and a complex relative permeability and a complex relative dielectric constant and different only in configuration.

In addition, arrangement of the reflecting plates is also made correspond to that of the reflecting plates shown in the first embodiment (Embodiment 1), and the reflecting plate 1*e* which is located within a cylindrical portion 5*b* provided on the upper surface of the outer packaging 5 and whose length is equal to that of the cylindrical portion 5*b* is arranged in the vicinity of the lower end portion of the antenna 2. As the reflecting plate 1*f*, which is arranged to cover the vicinity of the feeding point 4 and the vicinity of the upper end portion of the metallic cabinet 3, a reflecting plate having a width substantially equal to that of the outer packaging 5 is disposed to have its upper surface be in contact with the outer packaging. Furthermore, the reflecting plate 1*g*, which is arranged to cover the vicinity of the lower end portion of the metallic cabinet 3, is here designed to have the same thickness, curvature and width as those of the reflecting plate 1*f* and is disposed to have its lower surface be in contact with the outer packaging. Rear end surfaces of the reflecting plates 1*g* and 1*f* are positioned on the same plane.

Since the reflecting plates here illustrated are designed to have a curvature, the direction of reflection of electromagnetic waves incident on the reflecting plates differs from that of the flat plate type reflecting plates shown in the first embodiment (Embodiment 1) to enable effects of a hand exercised on communication performance to be reduced as described in the following.

Figure 14A:
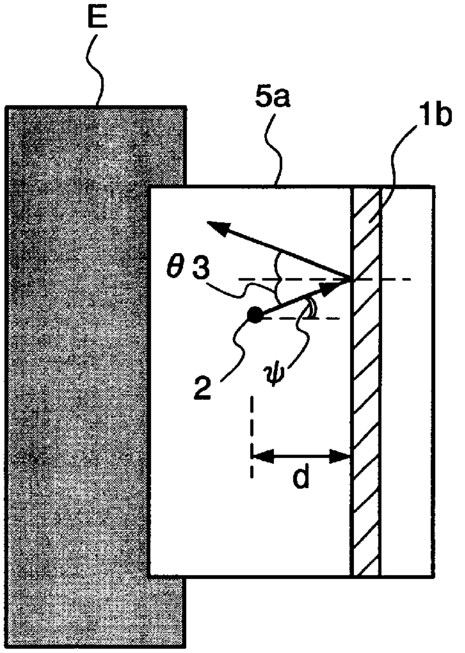
FIG. 14A is a view schematically showing a direction of reflection of an electromagnetic wave in a plane xy when a flat plate type reflecting plate having a curvature is arranged.
Figure 14B:
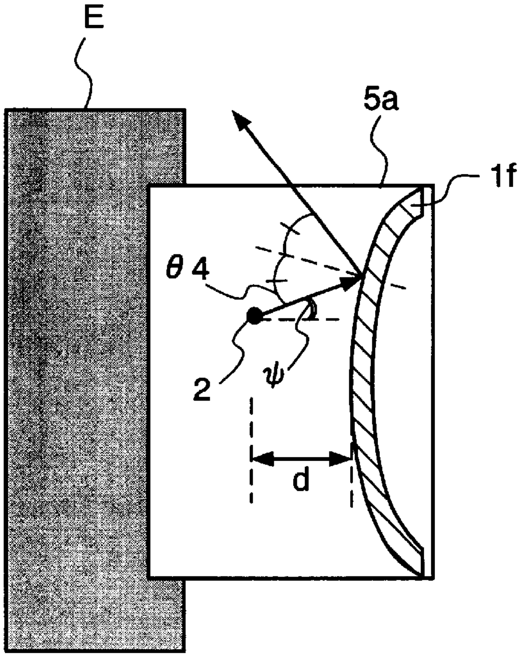
FIG. 14B is a view schematically showing a direction of reflection of an electromagnetic wave in the plane xy when a flat plate type reflecting plate having a curvature is arranged.

FIGS. 14A and 14B schematically show a difference between directions of electromagnetic waves reflected by a flat plate type reflecting plate and a reflecting plate having a curvature in the plane xy taking, as examples, the reflection plate 1*b* of the first embodiment (Embodiment 1) in which a flat plate type reflecting plate is disposed to cover the vicinity of the feeding point and the vicinity of the upper end portion of the metallic cabinet and the reflecting plate 1*f*. FIG. 14A shows a case where the flat plate type reflecting plate 1*b* of the first embodiment is disposed, while 14B shows a case where the reflecting plate 1*f* having a curvature of the present embodiment is disposed. FIGS. 14A and 14B correspond to FIG. 2C showing the top sectional view of the portable telephone in which a flat plate type reflecting plate is arranged and FIG. 6C, respectively, from which figures illustration of the cylindrical portion 5*b* of the outer packaging 5 and the metallic cabinet 3 is omitted for the purpose of making the figures be easily seen. In the figures, assuming, for example, that a user makes a call while holding the vicinity of the uppermost part of the outer packaging by his hand, a region at which the hand is located is indicated as E and both of the reflecting plates have their surfaces closest to the antenna located at the same distance d.

Consideration will be given to a case where in FIGS. 14A and 14B, electromagnetic waves radiated from the feeding point in the angle $\phi$ direction are incident on the reflecting plates. In FIG. 14B, since the reflecting plate has a curvature, the angle of incidence of $\theta$4 is larger than the angle of incidence of $\theta$3 in FIG. 14A and the angle of reflection is accordingly increased. As a result, the direction of reflection of electromagnetic waves falls within a relatively narrow range in FIG. 14A, while the direction falls within a wider range in FIG. 14B to increase directivity. Thus, since arranging the flat plate type reflecting plate 1*b* might cause reduction in the amount of electromagnetic waves contributing to communication because of effects of a hand when taking a reflection direction of the electromagnetic wave into consideration, it is preferable for improving radiation efficiency more effectively to use such a reflecting plate 1*f* having a curvature as illustrated in FIG. 14B to make the reflection direction fall within a wider range.

Since in the portable telephone of the present embodiment, the three reflecting plates 1*e*, 1*f* and 1*g* are arranged substantially at the same positions as those of the reflecting plates 1*a*, 1*b* and 1*c* in the first embodiment (Embodiment 1), respectively, and the reflecting plates are appropriately and selectively arranged to effectively act on the magnetic field in the vicinity of the feeding point 4 and the electric field in the vicinity of the lower end portion of the metallic cabinet 3, effects of these reflecting plates enable, similarly to the first embodiment, effective reflection of electromagnetic waves which are radiated from the radiation source in the vicinity of the feeding point 4 and whose dominant component is a magnetic field component and electromagnetic waves which are radiated from the vicinity of the lower end portion of the metallic cabinet 3 and whose dominant component is an electric field component.

As described in the foregoing, the-portable telephone using a reflecting plate having a curvature of the present embodiment allows a reflection direction to fall within a relatively wide range, enables more electromagnetic waves to be radiated in a direction opposite to the direction in which a speech transmission unit and a speech reception unit are arranged and toward a free space, enables effects of a hand exercised on communication performance to be reduced and radiation efficiency during a call to be further improved, thereby improving communication performance.

Embodiment 4

Figure 7:
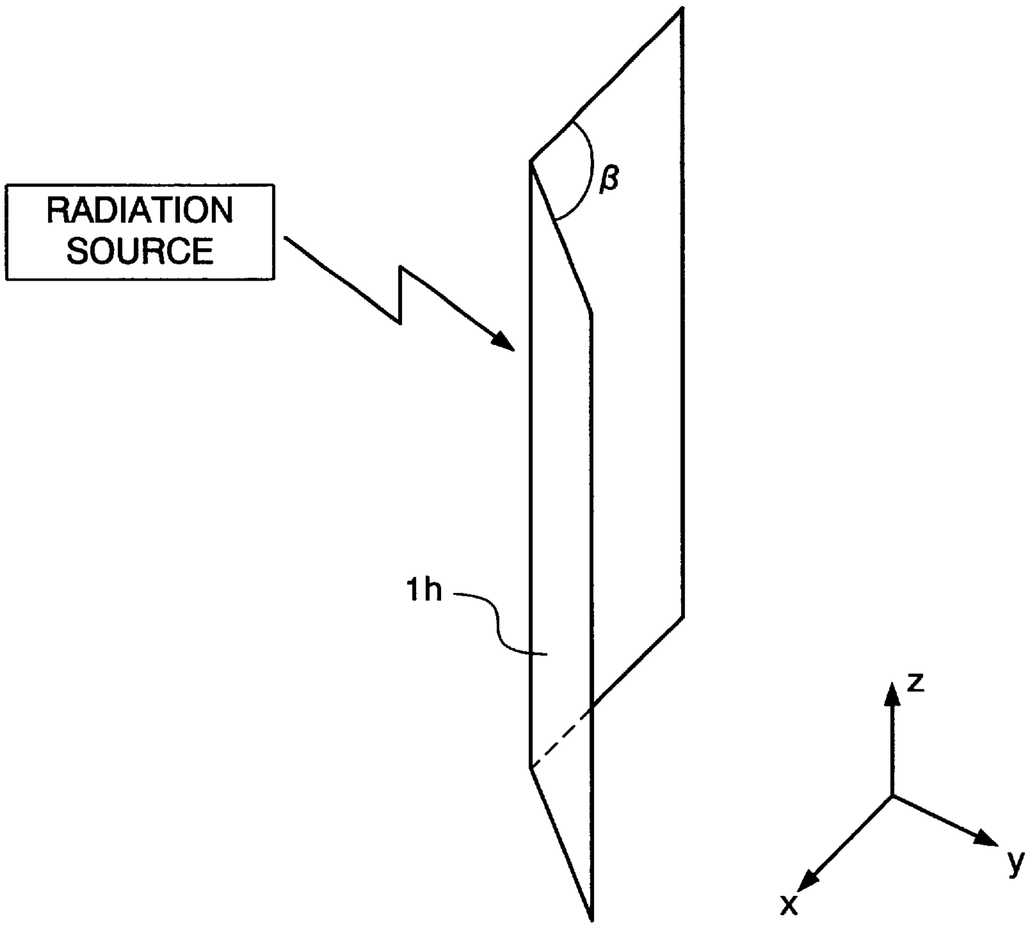
FIG. 7 is a perspective view of a reflecting plate used in a portable telephone according to a fourth embodiment of the present invention.

Next, as a fourth embodiment of the present invention, the reflecting plate having a curvature in the portable telephone of the third embodiment (Embodiment 3) is replaced, for example, by a reflecting plate 1*h* having a V-shaped structure shown in the perspective view of FIG. 7. The reflecting plate 1*h* is obtained by bending one flat plate into V-shaped to have an angle β toward the side opposite to a direction in which electromagnetic waves are incident. This reflecting plate is equivalent to a plate having an angle in place of a curvature for incident electromagnetic waves. In the present embodiment, an angle of incidence at which electromagnetic waves are incident on the reflecting plate is larger than that in a case of a flat plate and an angle of reflection becomes larger accordingly similarly to a case of a reflecting plate having a curvature. Therefore, similarly to the third embodiment using a reflecting plate having a curvature, using a V-shaped reflecting plate enables a reflection direction to fall within a relatively wider range.

The V-shaped reflecting plate 1*h* in the portable telephone is arranged, as illustrated in FIG. 7, to have a projection portion of the V-shape face to the radiation source side. In the vicinity of the feeding point, disposed is, for example, a reflecting plate having the same complex relative permeability as that of the reflecting plate 1*f* used in the third embodiment and in the vicinity of the lower end portion of the metallic cabinet, a reflecting plate having the same complex relative dielectric constant as that of the reflecting plate 1*g* in the third embodiment is disposed to have a desired size and angle. Such arrangement achieves the same effects as those described in the third embodiment to improve radiation efficiency during a call without involving effects of electric power absorption by the reflecting plate, thereby improving communication performance. Effects of a hand exercised on communication performance can be also reduced.

Embodiment 5

Although illustrated in the foregoing as the embodiments of the present invention are example with arrangement and configuration of reflecting plates varied, such reflecting plate arrangement and configuration as described in the following are possible as a further embodiment of the present invention.

Figure 8:
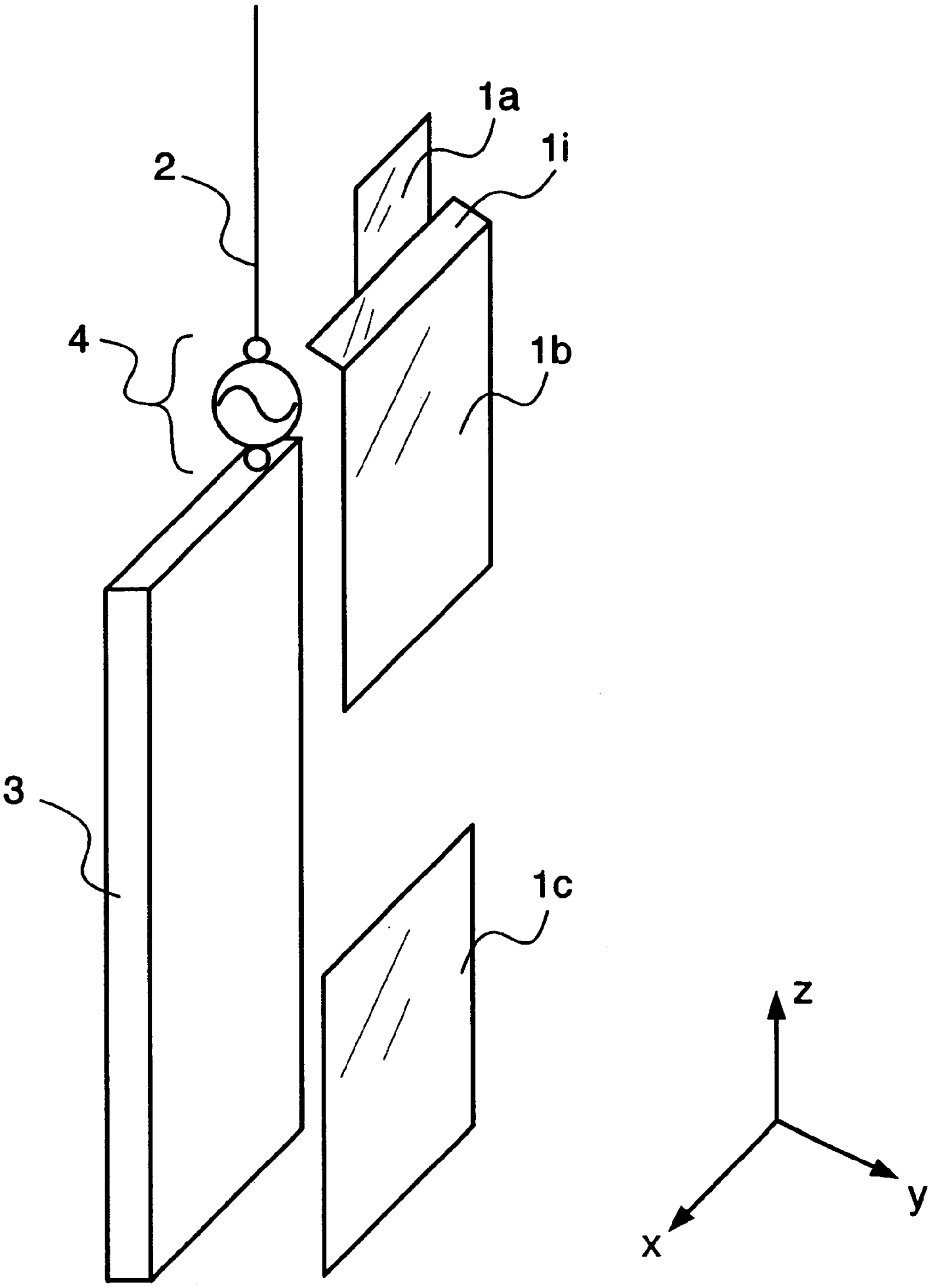
FIG. 8 is a perspective view showing a portable telephone according to a fifth embodiment of the present invention with an outer packaging removed.
Figure 9A:
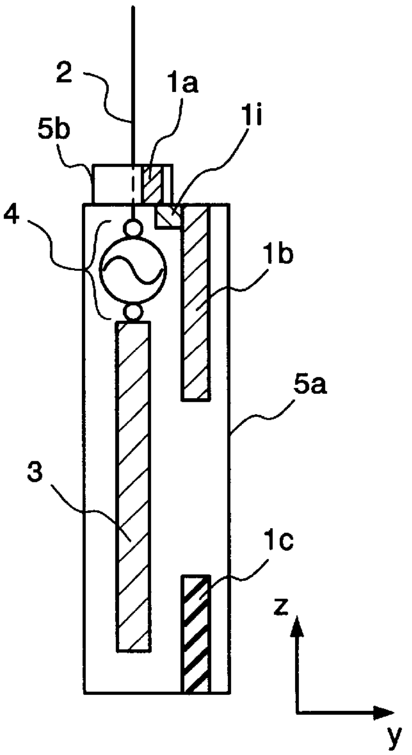
FIG. 9A is a cross-sectional view of the fifth embodiment with the outer packaging attached.
Figure 9B:
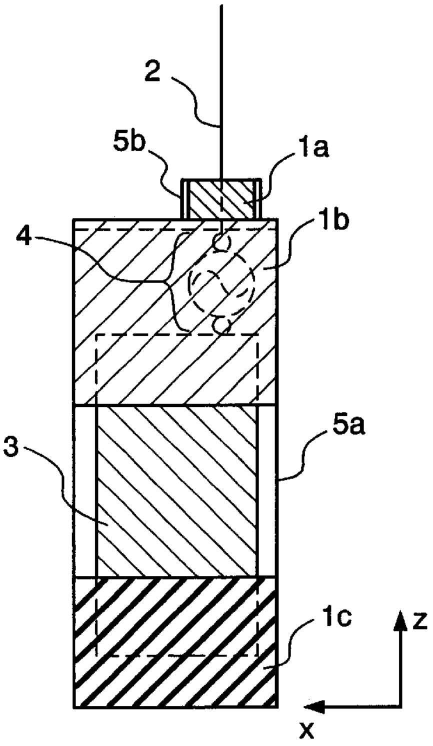
FIG. 9B is a front sectional view of the fifth embodiment with the outer packaging attached.
Figure 9C:
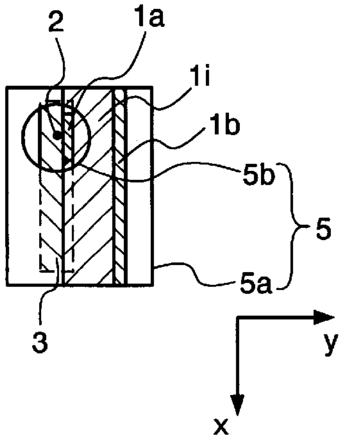
FIG. 9C is a top sectional view of the fifth embodiment with the outer packaging attached.

It is for example possible in the portable telephone of the first embodiment (Embodiment 1), as illustrated in the perspective view of FIG. 8 showing a structure of a portable telephone with an outer packaging removed, to newly arrange a flat plate type reflecting plate 1*i* so as to be in contact with the reflecting plates 1*a* and 1*b*. State where the outer packaging is attached is shown in FIGS. 9A to 9C whose sectional views correspond to those of FIGS. 2A to 2C, respectively.

Here, the reflecting plate 1*i* is formed of a magnetic material and is designed to have the same width and complex relative permeability as those of the reflecting plate 1*b* as an example. As can be seen from FIG. 8 and FIGS. 9A to 9C, the reflecting plate 1*i* has its upper surface and the side surface in contact with the reflecting plates 1*a* and 1*b*, respectively, and is disposed to have the upper surface in contact with the outer packaging. While in the first embodiment (Embodiment 1), the reflecting plates 1*a* and 1*b* are arranged to have a space therebetween, in the present embodiment, disposing the reflecting plate 1*i* prevents the two reflecting plates from having a space. Therefore, the portable telephone illustrated in FIG. 8 enables electromagnetic waves to be reflected without leakage due to a space, so that the amount of electromagnetic waves contributing to communication is increased to further improve radiation efficiency as a result.

Embodiment 6

Figure 10:
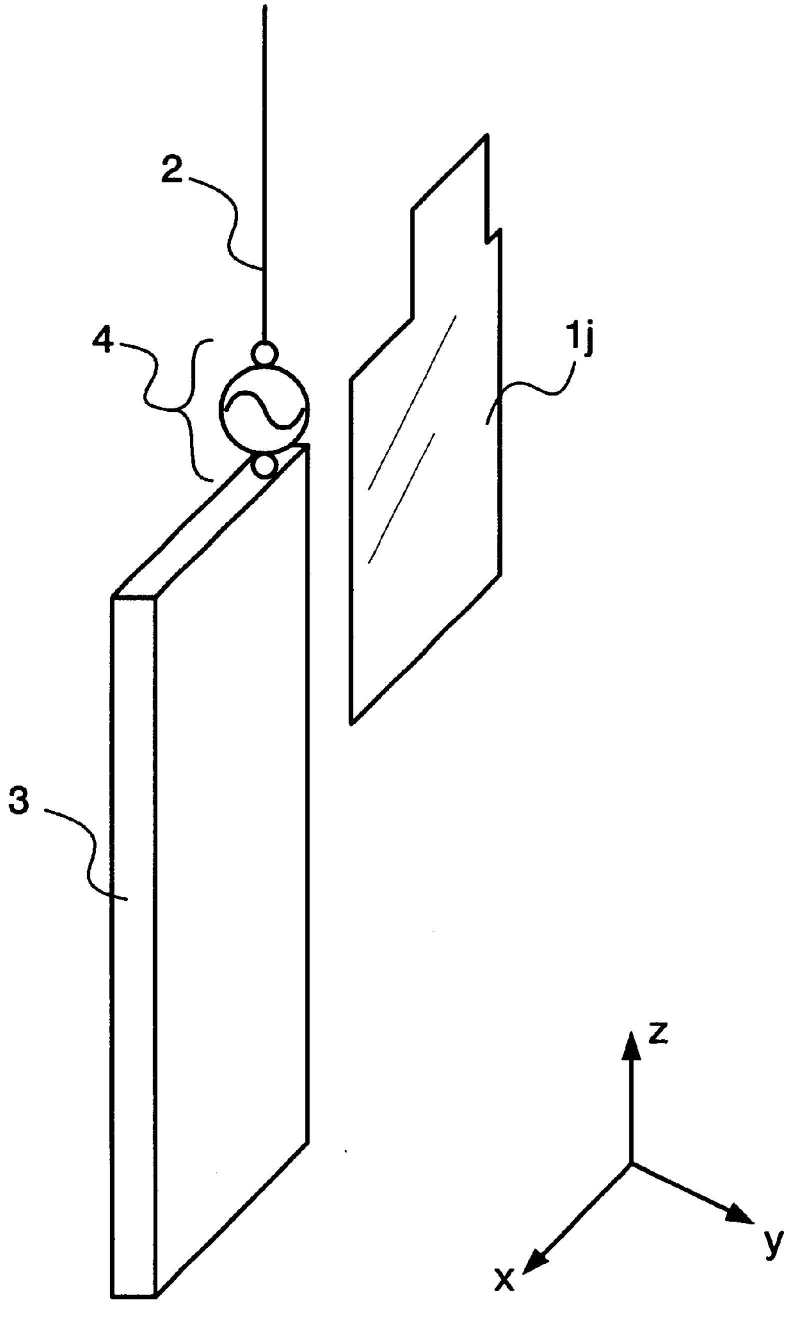
FIG. 10 is a perspective view showing a portable telephone according to a sixth embodiment of the present invention with an outer packaging removed.
Figure 11A:
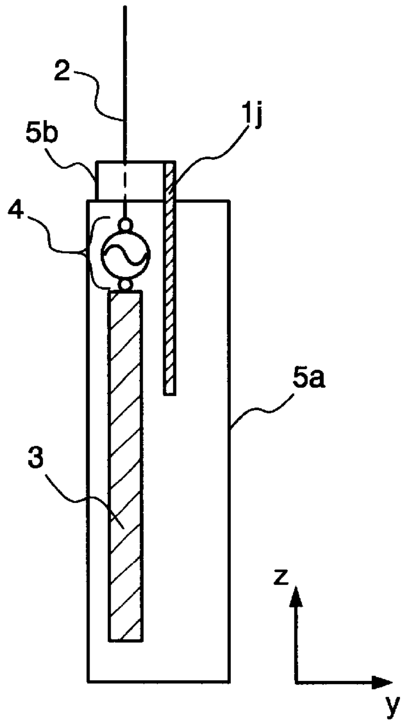
FIG. 11A is a cross-sectional view of the sixth embodiment with the outer packaging attached.
Figure 11B:
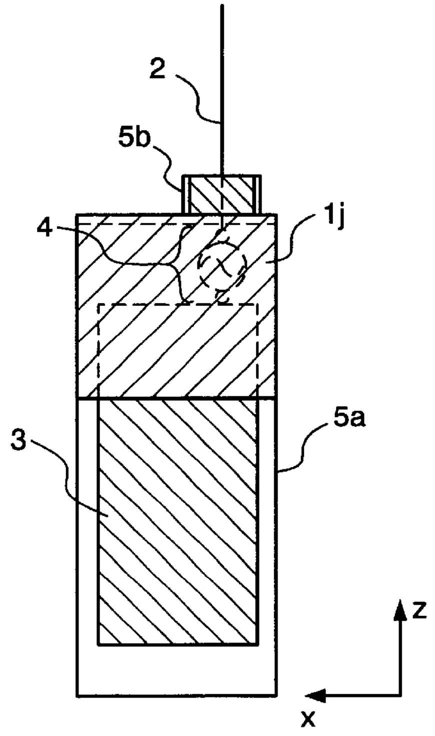
FIG. 11B is a front sectional view of the sixth embodiment with the outer packaging attached.
Figure 11C:
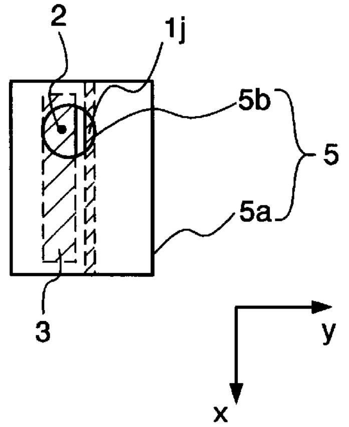
FIG. 11C is a top sectional view of the sixth embodiment with the outer packaging attached.

It is also possible in the portable telephone shown in the first embodiment (Embodiment 1), for example, to arrange a reflecting plate 1*j* which is obtained by joining the reflecting plates 1*a* and 1*b* to be positioned on the same plane as illustrated in the perspective view of FIG. 10 showing a structure of a portable telephone with an outer packaging removed. State where the outer packaging is attached is illustrated in FIGS. 11A to 11C whose sectional views correspond to those of FIGS. 2A to 2C, respectively. In the present embodiment, the metallic cabinet is arranged to be shifted to the side of the outer packaging surface opposite to the side where the speech transmission unit and the speech reception unit are disposed as can be seen from FIGS. 11A to 11C.

Employed here as a material of the reflecting plate 1*j* as an example is that having the same complex relative permeability as that of the reflecting plate 1*b*. As can be seen from FIG. 10 and FIGS. 11A to 11C, the reflecting plate 1*j* is equivalent to the one obtained by moving the reflecting plate 1*b* shown in the first embodiment (Embodiment 1) down the reflecting plate 1*a* placed within the cylindrical portion 5*b* and joining them. As a result, the amount of electromagnetic waves contributing to communication is increased because of lack of a space to further improve radiation efficiency.

Moreover, as a configuration of a reflecting plate, the reflecting plates shown in the second and the third embodiments (Embodiments 2 and 3) may be combined to form one reflecting plate, thereby adjusting the direction of reflection of electromagnetic waves. For example, possible is a reflecting plate made by arranging the reflecting plate If illustrated in FIG. 5 to have its upper surface side be in contact with the lower surface side of the reflecting plate 1*d* illustrated in FIG. 3 which is disposed aslant with respect to the metallic cabinet. It is also possible to arrange the reflecting plate formed of a desired size in the vicinity of a feeding point within an outer packaging and arbitrarily change, in the plane xy and the plane yz, the direction of reflection of electromagnetic waves radiated from the vicinity of the feeding point toward the side where a speech transmission unit and a speech reception unit are disposed, thereby reducing the effects of a hand exercised on communication performance.

As described in the foregoing, a reflecting plate of the present invention can be set to have an arbitrary size and an arbitrary configuration having desired curvature and angle, and a plurality of reflecting plates may be used or they may be used individually. In addition, in the portable telephone of the present invention, the above-described reflecting plates may be variously combined for use, such as a combination with replacement only of the flat type reflecting plate 1*a* disposed in the cylindrical portion in the portable telephone according to the first embodiment shown in FIG. 1 and FIGS. 2A to 2C by the reflecting plate 1*e* of the third embodiment shown in FIG. 5 and FIGS. 6A to 6C.

Embodiment 7

Although the present invention has been described in the foregoing with respect to the embodiments in which reflecting plates are arranged in an outer packaging the reflecting plates of the present invention may be used also as an outer packaging. In a seventh embodiment of the present invention, a magnetic material and a dielectric material having the same complex relative permeability and complex relative dielectric constant as those of the reflecting plates used in the above-described embodiments are used in an outer packaging and no independent reflecting plate is disposed within the packaging.

Figure 12:
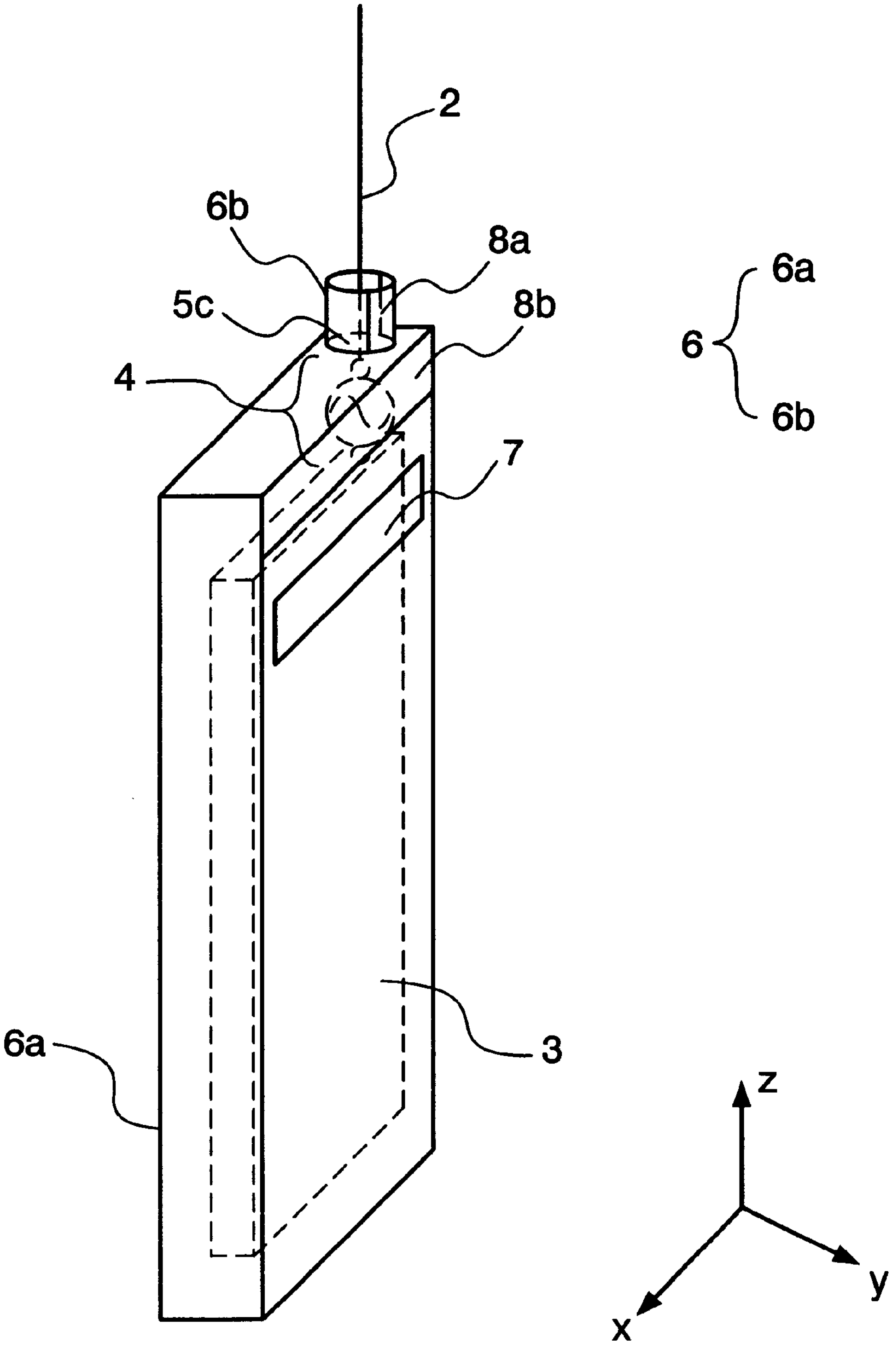
FIG. 12 is a perspective view showing a portable telephone according to a seventh embodiment of the present invention.

FIG. 12 is a perspective view showing one example of a portable telephone according to the seventh embodiment of the present invention. The present embodiment is the same as conventional portable telephones in arrangement and position of an outer packaging and such components disposed within the outer packaging as the antenna 2, the metallic cabinet 3 and the feeding point 4 and operation of the portable telephone but different in an outer packaging structure in that it serves also as a reflecting plate. Shown in the present embodiment is a portable telephone in which an antenna and a metallic cabinet have a length of approximately $\lambda/4$.

With reference to FIG. 12, an outer packaging 6 used in the present embodiment is made up of a hollow cubic portion 6*a* and a cylindrical portion 6*b* formed on a round hole 5*c* of the cubic portion 6*a*, in which magnetic materials 8*a* and 8*b* having the same complex relative permeability as that of the reflecting plate 1*b* described in the first embodiment and shown in FIGS. 1 and 2 are provided at a part of the cubic portion 6*a* and a part of the cylindrical portion 6*b*, and plastics, resin or other material is used for the remaining part.

The magnetic material 8*a* is provided at a region on the side where a speech transmission unit and a speech reception unit are arranged in the cylindrical portion 6*b*. Since in general, on the outer packaging on the side where the speech transmission unit and a speech reception unit are arranged, a display unit 7 having a display function such as a liquid crystal display is provided, the magnetic material 8*b* is disposed on the upper side of the display unit 7.

As has been described in relation with the first embodiment (Embodiment 1), in electromagnetic waves radiated from the antenna 2 in the vicinity of the feeding point 4, dominant component is a magnetic field component. The magnetic materials 8*a* and 8*b* are placed in the vicinity of the feeding point and on the side where the speech transmission unit and the speech reception unit are arranged and their complex relative permeabilities have a desired value of a real part larger than 1 at a frequency used in the portable telephone and a value of an imaginary part approximate to 0. Electromagnetic waves which are radiated from the vicinity of the feeding point and whose dominant component is a magnetic field component are accordingly reflected by the magnetic materials 8*a* and 8*b* toward the opposite direction. In other words, since the magnetic material has a value of an imaginary part of a complex relative permeability approximate to 0, effects of power absorption by a reflecting plate which is a problem of a reflecting plate having a loss are small. The present embodiment therefore enables electromagnetic waves to be reflected involving little power absorption by a reflecting plate.

Although in the foregoing, description has been made of the example of an outer packaging formed of a magnetic material, the packaging may be formed of a dielectric material and for example, a dielectric material having the same complex relative dielectric constant as that of the reflecting plate 1*c* described in the first embodiment and shown in FIG. 1 and FIGS. 2A to 2C may be provided at a lower part of the outer packaging surface so as to cover the vicinity of the lower end portion of the metallic cabinet.

As a reflecting plate or an outer packaging formed of a magnetic material used in the present invention, any magnetic material having the above-described complex relative permeability can be employed and, for example, such a magnetic material as ferrite sintered body, a compound material manufactured by mixing a magnetic material and resin, and furthermore, a magnetic thin film may be used. Also, a dielectric material forming a reflecting plate may be any dielectric material having the above-described dielectric characteristics and, for example, a compound material manufactured by mixing the adjusted amount of carbon or graphite with rubber, and a dielectric thin film may be used.

Among magnetic materials, there exist those having dielectric characteristics in addition to magnetic materials. For forming a reflecting plate or the like with a magnetic material having such characteristics in the present invention, used in order to eliminate effects of power absorption is a reflecting plate having, at a frequency used in a portable telephone, a desired value of a real part of a complex relative permeability larger than 1 and a value of an imaginary part approximate to 0 and a value of an imaginary part of a complex relative dielectric constant approximate to 0. Since an imaginary part of a complex relative dielectric constant is proportional to a conductivity, a reflecting plate or the like formed of the above-described magnetic material having dielectric characteristics in addition to magnetic characteristics and a reflecting plate or the like formed of the above-described dielectric material in the present embodiment have their conductivities approximate to 0 and are little conductive.

Also, since the reflecting plate or the like formed of a magnetic material and the reflecting plate or the like formed of a dielectric material used in the present invention effectively reflect electromagnetic waves radiated from a radiation source, as well as reducing the effects of power absorption by the magnetic material and the dielectric material forming the reflecting plates or the like at the time of irradiation of electric waves, thereby increasing the amount of electromagnetic waves contributing to communication as a result, an imaginary part may not be approximate to 0 and in a case of a reflecting plate or the like formed of a magnetic material, for example, a ratio of a real part to an imaginary part of a complex relative permeability (=imaginary part/real part) may be not more than 0.5.

As described in the foregoing, the present embodiment employs a magnetic material and a dielectric material for forming an outer packaging itself to reflect electromagnetic waves radiated from a radiation source, thereby making effective use of electromagnetic waves which makes a small contribution to communication in conventional art. As a result, the mount of electromagnetic waves contributing to communication is increased and radiation efficiency during a call is improved accordingly to improve communication performance. Although in the first to sixth embodiments, the effects are attained by arranging the reflecting plates within the outer packaging, when ensuring a space for arranging a reflecting plate is not easy as requirements on smaller-sized and thinner portable telephones become more demanding, forming an outer packaging with a magnetic material and a dielectric material having the same complex relative permeability and complex relative dielectric constant as those of the reflecting plates as is done in the present embodiment produces the effects.

In addition, although the portable telephone of the present invention has been described taking a portable telephone having an antenna structure in which an antenna and a metallic cabinet have a length of approximately λ/4 as an example, with respect to the first to sixth embodiments illustrating the cases where a reflecting plate formed of a magnetic material or a dielectric material is provided in the vicinity of a feeding point and in the vicinity of a lower end portion of a metallic cabinet and the seventh embodiment illustrating the case where a part of an outer packaging itself in the vicinity of a feeding point or in the vicinity of a lower end portion of a metallic cabinet is formed of a magnetic material or a dielectric material, the present invention is also applicable to a portable telephone having none of such an antenna structure and in this case, a magnetic field distribution and an electric field distribution in the vicinity of a radiation source may be evaluated in advance to form a reflecting plate or an outer packaging at a place where a magnetic field is dominant by using a magnetic material and a reflecting plate or an outer packaging at a place where an electric field is dominant by using a dielectric material.

As described in the foregoing, since the portable telephone of the present invention enables electromagnetic waves radiated from a radiation source to be reflected in the opposite direction to contribute to communication by arranging a reflecting plate within the portable telephone, effective use of electromagnetic waves radiated is possible. In addition, since use of a reflecting plate which involves little power absorption at the time of irradiation of electric waves enables an increase in the amount of electromagnetic waves contributing to communication, radiation efficiency during a call is improved to enable improvement of communication performance.

Moreover, using a reflecting plate also as an outer packaging of the portable telephone makes it possible to increase the amount of electromagnetic waves contributing to communication even in a portable telephone required to be small-sized and thin and to improve radiation efficiency during a call, thereby realizing improvement of communication performance.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A portable telephone including an antenna and a metallic cabinet operating as main radiation sources of electromagnetic waves, a feeding point for suppling said antenna and said metallic cabinet with electric power, an outer packaging formed of a material such as plastics or resin, and a reflecting plate for reflecting the electromagnetic waves radiated from said radiation sources, wherein said reflecting plate is provided for increasing the amount of electromagnetic waves radiated into a free space when the portable telephone is in use, selectively arranged at a position where an electric field component or a magnetic field component of the electromagnetic waves radiated from said radiation sources is dominant, and is formed of a magnetic material, and a ratio of a real part to an imaginary part of a complex relative permeability at a frequency used in the portable telephone of said magnetic material is not more than 0.5.

2. The portable telephone as set forth in claim 1, wherein said reflecting plate is contained in the outer packaging and provided in the vicinity of said radiation sources and on the side where a speech transmission unit and a speech reception unit are disposed.

3. The portable telephone as set forth in claim 1, wherein said reflecting plate is a flat plate of a predetermined size and arranged in parallel to said metallic cabinet surface.

4. The portable telephone as set forth in claim 1, wherein said reflecting plate is contained in the outer packaging and provided in the vicinity of said radiation sources and on the side where a speech transmission unit and a speech reception unit are disposed, and a flat plate of a predetermined size and arranged in parallel to said metallic cabinet surface.

5. The portable telephone as set forth in claim 1, wherein said reflecting plate is a flat plate of a predetermined size and arranged aslant with respect to the metallic cabinet surface.

6. The portable telephone as set forth in claim 1, wherein said reflecting plate is contained in the outer packaging and provided in the vicinity of said radiation sources and on the side where a speech transmission unit and a speech reception unit are disposed, and said reflecting plate is a flat plate of a predetermined size and arranged aslant with respect to the metallic cabinet surface.

7. The portable telephone as set forth in claim 1, wherein said reflecting plate is formed to be convex having a curvature at the side opposite to a direction in which the electromagnetic waves are incident and arranged to have a substantial vertex of the convexity face to the side of said radiation sources.

8. The portable telephone as set forth in claim 1, wherein said reflecting plate is contained in the outer packaging and provided in the vicinity of said radiation sources and on the side where a speech transmission unit a speech reception unit are disposed, and said reflecting plate is formed to be convex having a curvature at the side opposite to a direction in which the electromagnetic waves are incident and arranged to have a substantial vertex of the convexity face to the side of said radiation sources.

9. The portable telephone as set forth in claim 1, wherein said reflecting plate is bent to be V-shaped toward the side opposite to a direction in which the electromagnetic waves are incident.

10. The portable telephone as set forth in claim 1, wherein said reflecting plate is contained in the outer packaging and provided in the vicinity of said radiation sources and on the side where a speech transmission unit and a speech reception unit are disposed, and said reflecting plate is bent to be V-shaped toward the side opposite to a direction in which the electromagnetic waves are incident.

11. The portable telephone as set forth in claim 1, wherein said reflecting plate is formed of a magnetic material having a complex relative permeability as causes little power absorption of the electromagnetic waves radiation from said radiation sources.

12. The portable telephone as set forth in claim 1, wherein said reflecting plate is formed of a dielectric material having such a complex relative dielectric constant as causes little power absorption of the electromagnetic waves radiated from said radiation sources.

13. The portable telephone as set forth in claim 1, wherein said reflecting plate is provided in the plural including:

a reflecting plate formed of a magnetic material having such a complex relative permeability as causes little power absorption of the electromagnetic waves radiated from said radiation sources, and a reflecting plate formed of a dielectric material having such a complex relative dielectric constant as causes little power absorption of the electromagnetic waves radiated from said radiation sources.

14. The portable telephone as set forth in claim 13, wherein a reflecting plate formed of a magnetic material is disposed at a region where a magnetic field component of the electromagnetic waves generated from said radiation sources is dominant and a reflecting plate formed of a dielectric material is disposed at a region where an electric field component of the electromagnetic waves generated from said radiation sources is dominant.

15. The portable telephone as set forth in claim 13, wherein

A reflecting plate formed of a magnetic material is disposed to cover the vicinity of said feeding point and a reflecting plate formed of a dielectric material is disposed to cover the vicinity of a lower end portion of said metallic cabinet.

16. The portable telephone as set forth in claim 1, wherein said reflecting plate is a reflecting plate formed of a magnetic material whose complex relative permeability at a frequency used in the portable telephone has a real part value larger than 1 and has an imaginary part value approximate to 0.

17. The portable telephone as set forth in claim 1, wherein said reflecting plate is a reflecting plate formed of a magnetic material whose complex relative permeability at a frequency used in the portable telephone has a real part value larger than 1 and has an imaginary part value approximate to 0 and which has no conductivity.

18. The portable telephone as set forth in claim 1, wherein said reflecting plate is a reflecting plate formed of a dielectric material whose complex relative dielectric constant at a frequency used in the portable telephone has a real part value larger than a value of a real part of a complex relative dielectric constant of said outer packaging and has an imaginary part value approximate to 0.

19. A portable telephone including an antenna and a metallic cabinet operating as main radiation sources of electromagnetic waves, a feeding point for supplying said antenna and said metallic cabinet with electric power, and an outer packaging, wherein said outer packaging is for increasing the amount of electromagnetic waves radiated into a free space when the portable telephone is in use and has a region where an electric field component or a magnetic field component of the electromagnetic waves radiated from said radiation sources is dominant partially provided with a material and said material is a magnetic material, and a ratio of a real part to an imaginary part of a complex relative permeability at a frequency used in the portable telephone of said magnetic material is not more than 0.5.

20. The portable telephone as set forth in claim 19, wherein in said outer packaging, a part of the surface of the outer packaging which is in the vicinity of said radiation sources and at the side where a speech transmission unit and a speech reception unit are disposed is provided with a region of a magnetic material whose complex relative permeability at a frequency used in the portable telephone has a real part value larger than 1 and has an imaginary part value approximate to 0 and the remaining part is formed of a material such as plastics or region resin.

21. The portable telephone as set forth in claim 19, wherein in said outer packaging, a part of the surface of the outer packaging which is in the vicinity of said radiation sources and at the side where a speech transmission unit and a speech reception unit are disposed is provided with a region of a dielectric material whose complex relative dielectric constant at a frequency used in the portable telephone has a real part value larger than a value of a real part of a complex relative dielectric constant of said material such as plastic or resin and has an imaginary part value approximate to 0 and the remaining part is formed of a material such as plastic or resin.

22. The portable telephone as set forth in claim 19, wherein a magnetic field distribution and an electric field distribution in the vicinity of said radiation surfaces are evaluated in advance to from a part of said outer packaging at a region where a magnetic field component is dominant by using a magnetic material and a part of said outer packaging at a region where an electric field component is dominant by using a dielectric material, form said outer packaging by using said magnetic material and said dielectric material and form the remaining part by using such a material as plastics or resin.

23. The portable telephone as set forth in claim 1, wherein said reflecting plate has an electric constant which enables effective reflection of said magnetic field component or said electric field component and causes little electric power absorption.

24. The portable telephone as set forth in claim 19, wherein said material has an electric constant which enables effective reflection of said magnetic field component or said electric field component.

25. A portable telephone including an antenna and a metallic cabinet operating as main radiation sources of electromagnetic waves, a feeding point for supplying said antenna and said metallic cabinet with electric power, an outer packaging formed of a material such as plastics or resin, and a reflecting plate for reflecting the electromagnetic waves radiated from said radiation sources, wherein said reflecting plate is disposed so as to cover said feeding point, and is formed of a magnetic material, and a ratio of a real part to an imaginary part of a complex relative permeability at a frequency used in the portable telephone of said magnetic material is not more than 5.

* * * * *